(12) United States Patent
Coates et al.

(10) Patent No.: US 10,184,670 B2
(45) Date of Patent: Jan. 22, 2019

(54) HEATING PANEL AND METHOD THEREFOR

(71) Applicant: WINSTONE WALLBOARDS LIMITED, Auckland (NZ)

(72) Inventors: Richard Dod Coates, Auckland (NZ); Alexander Stewart Vaughan, Auckland (NZ)

(*) Notice: Subject to any disclaimer, the term of this patent is extended or adjusted under 35 U.S.C. 154(b) by 306 days.

(21) Appl. No.: 15/293,856

(22) Filed: Oct. 14, 2016

(65) Prior Publication Data
US 2017/0030591 A1 Feb. 2, 2017

Related U.S. Application Data

(63) Continuation of application No. 15/150,306, filed on May 9, 2016, now Pat. No. 9,482,438, which is a continuation of application No. 13/508,024, filed as application No. PCT/IB2010/055016 on Nov. 5, 2010.

(60) Provisional application No. 61/272,804, filed on Nov. 5, 2009.

(51) Int. Cl.
| | |
|---|---|
| *F24D 13/02* | (2006.01) |
| *H05B 3/28* | (2006.01) |
| *H05B 3/00* | (2006.01) |
| *H05B 3/14* | (2006.01) |
| *H05B 1/02* | (2006.01) |

(52) U.S. Cl.
CPC ......... *F24D 13/024* (2013.01); *F24D 13/022* (2013.01); *H05B 1/0277* (2013.01); *H05B 3/0014* (2013.01); *H05B 3/145* (2013.01); *H05B 3/28* (2013.01); *H05B 3/286* (2013.01); *H05B 2203/004* (2013.01); *H05B 2203/011* (2013.01); *H05B 2203/013* (2013.01); *Y02B 30/26* (2013.01); *Y10T 29/49083* (2015.01)

(58) Field of Classification Search
None
See application file for complete search history.

(56) References Cited

U.S. PATENT DOCUMENTS

| | | |
|---|---|---|
| 3,214,565 A | 10/1965 | Hager, Jr. |
| 3,438,843 A | 4/1969 | Pagel |
| 3,594,545 A | 7/1971 | Green |
| 3,745,649 A | 7/1973 | Doi et al. |
| 3,751,630 A | 8/1973 | Brasky |
| 4,017,967 A | 4/1977 | Wells |
| 4,032,751 A | 6/1977 | Youtsey |
| 4,158,078 A | 6/1979 | Egger |
| 4,207,129 A | 6/1980 | Tadewald |
| 4,278,877 A | 7/1981 | Werych |
| 4,429,214 A | 1/1984 | Brindley et al. |

(Continued)

FOREIGN PATENT DOCUMENTS

| | | |
|---|---|---|
| AU | 701134 | 6/1998 |
| AU | 1731094 | 6/1998 |

(Continued)

*Primary Examiner* — Joseph M Pelham
(74) *Attorney, Agent, or Firm* — Palmer IP Inc.

(57) ABSTRACT

A radiant heating panel, for typical use as cover for interior walls and ceilings, is provided, that is manufactured in a continuous process involving at least one sheet material, a settable material and a heating element. A method of installing such a heating panel is also provided, along with an apparatus and method required to terminate the heating panel.

21 Claims, 11 Drawing Sheets

(56) References Cited

U.S. PATENT DOCUMENTS

| | | | |
|---|---|---|---|
| 4,442,139 A | 4/1984 | Brigham | |
| 4,471,212 A | 9/1984 | Hager, Jr. | |
| 4,534,886 A | 8/1985 | Kraus et al. | |
| 4,617,450 A * | 10/1986 | Boes | H05B 3/28 |
| | | | 162/218 |
| 4,878,332 A * | 11/1989 | Drake | F24D 3/141 |
| | | | 52/745.05 |
| 4,888,472 A | 12/1989 | Stitz | |
| 5,004,895 A | 4/1991 | Nishino | |
| 5,023,433 A | 6/1991 | Gordon | |
| 5,131,458 A | 7/1992 | Bourne | |
| 5,220,762 A | 6/1993 | Lehnert | |
| 5,756,215 A | 5/1998 | Sawamura et al. | |
| 5,925,275 A | 7/1999 | Lawson | |
| 6,172,344 B1 | 1/2001 | Gordon | |
| 6,471,799 B1 | 10/2002 | Sasaki et al. | |
| 7,268,325 B1 | 9/2007 | Chuang | |
| 8,039,774 B2 | 10/2011 | Dubey | |
| 8,158,231 B2 | 4/2012 | Hopkins | |
| 8,197,621 B2 * | 6/2012 | Jung | H05B 3/145 |
| | | | 156/300 |
| 8,618,445 B2 | 12/2013 | Dubey | |
| 2003/0150190 A1 | 8/2003 | Schroth | |
| 2004/0069771 A1 | 4/2004 | Kondo | |
| 2004/0069772 A1 * | 4/2004 | Kondo | B60N 2/5685 |
| | | | 219/549 |
| 2004/0152379 A1 | 8/2004 | McLarty, III | |
| 2004/0175164 A1 | 9/2004 | Loktev | |
| 2007/0149083 A1 | 6/2007 | Agrawl | |
| 2008/0047946 A1 | 2/2008 | Klompenberg | |
| 2008/0056694 A1 | 3/2008 | Cooper | |
| 2009/0152257 A1 | 6/2009 | Cheng | |
| 2009/0297132 A1 | 12/2009 | Abbott | |
| 2010/0065542 A1 | 3/2010 | Dubey | |
| 2010/0065543 A1 | 3/2010 | Dubey | |
| 2012/0175359 A1 | 7/2012 | Zimmerer | |

FOREIGN PATENT DOCUMENTS

| | | |
|---|---|---|
| AU | 727392 | 11/1999 |
| AU | 727384 | 8/2000 |
| AU | 781043 | 4/2001 |
| AU | 2002255025 | 11/2002 |
| GB | 788676 | 1/1958 |
| JP | 57101232 A | 6/1982 |
| JP | 1982101232 A | 6/1982 |
| JP | AS 587784 | 1/1983 |
| JP | 62062131 A | 3/1987 |
| JP | S62100416 | 6/1987 |
| JP | 62172114 A | 7/1987 |
| JP | US60108715 | 7/1987 |
| JP | S63266627 | 11/1988 |
| JP | 5133038 | 5/1993 |
| JP | 5166038 A | 5/1993 |
| JP | H06140134 | 5/1994 |
| JP | 9292134 A | 11/1997 |
| JP | 2003239519 | 8/2003 |
| JP | 2007165281 | 6/2007 |
| KR | 2005109634 A | 11/2005 |
| KR | 2006003376 A | 1/2006 |
| KR | 715361 B1 | 5/2007 |
| KR | 725189 B1 | 6/2007 |
| KR | 767781 B1 | 10/2007 |
| KR | 2009000038 | 1/2009 |
| KR | 2010129946 A | 12/2010 |
| KR | 2010129950 A | 12/2010 |
| NZ | 534056 | 1/2006 |
| NZ | 541851 | 6/2007 |
| NZ | 585645 | 5/2010 |
| NZ | 589027 | 11/2010 |
| NZ | 576422 | 3/2011 |
| WO | WO 1994/003947 | 2/1994 |
| WO | WO 2001073507 | 6/2001 |
| WO | WO 2004/069532 A1 | 8/2004 |
| WO | WO 2006/016200 | 2/2006 |
| WO | WO 2006/004282 A1 | 12/2006 |
| WO | WO 2009/055959 | 5/2009 |
| WO | WO 2009/063478 | 5/2009 |
| WO | WO 2009/088197 | 7/2009 |
| WO | WO 2009/088198 | 7/2009 |

* cited by examiner

HEATING PANEL AND METHOD THEREFOR

CROSS REFERENCE TO RELATED APPLICATIONS

This application is a continuation of U.S. patent application Ser. No. 15/150,306, filed on May 9, 2016, which is a continuation of U.S. patent application Ser. No. 13/508,024, filed on May 18, 2012, which is a US National Stage application under 35 USC 371 of PCT International Application No. PCT/IB2010/055016, filed on Nov. 5, 2010, which claims priority to, and the benefit of U.S. Provisional Patent Application No. 61/272,804, filed on Nov. 5, 2009, all of which are herein incorporated by reference in their entirety for all purposes.

TECHNICAL FIELD

The present invention relates to a heating panel and methods of production and installation therefore. More particularly but not exclusively it relates to a wallboard heater and method therefore.

BACKGROUND

Wallboards are typically used to provide an interior finish for building constructions. They may consist of gypsum panels coated on each side by a paper sheet. The introduction of a heating element into a wallboard for use as a radiant and convection heater is known, as disclosed in U.S. Pat. No. 3,598,960. Typically such wallboard heating operates mainly on the principle of radiant heating, with a small amount of convection heating resulting from the heated wallboard.

This heating offers many advantages, in that when the heating panel is used to cover a wall or preferably a ceiling, the heating effect it generates allows for an even distribution of heat, with a relatively large part of the room being exposed to the radiant heating effect, as compared to other radiant heating mechanisms.

Such a heating process is also an efficient heating process that can heat a large room up relatively quickly compared to convection heating.

One type of wallboard heating panel is made in a moulding process. This typically includes receiving gypsum slurry into a mould together with fibres to impart flexibility (since paper cannot be moulded to either side of the gypsum panel), as well as heating elements such as a metallic conductor. Such an example is shown in WO 2009/0055959.

However, the manufacture of such moulded heating panels is an expensive manual production process, and is difficult and hence expensive to automate. Further, such batch-type production processes may not allow for high production rates.

In another form, heating panels that operate on electrical resistivity or hot water conduction are mounted in the ceiling behind normal wallboards. Such heating panels are either hot water pipes, or plastic sheets having electrically resistive circuits embedded in them. A faulty connection of a heated water pipe system can result in parts of a ceiling or wall being ruined.

However, installing such heating panels is labour intensive as two sets of panels need to be installed in or on the ceiling.

Localised heating behind the wallboard means that high temperatures could cause the gypsum (which started as calcium sulphate hemihydrate, before it is hydrated and sets as calcium sulphate dihydrate after excess water is dried off) to lose its integrity and degenerate back to its hemihydrate form.

Typically the surface temperature of the plasterboard inside the room is required to be around 38° C., although the board can reach localised temperatures in the order of 50° C.

Heating panels installed behind ceiling cladding may also result in a longer heating up period, and may cause problems due to the high heat above the ceiling wallboards. One example of this is that structural timber may dry out and/or shrink, causing warping and/or movement of the installed ceiling.

The termination of electrically heated panels with embedded circuits or circuits disposed immediately behind the installed ceiling or wall panels can also be problematic, since any short circuit break in the circuit would be difficult to establish and locate. Also, such systems usually have established termination points at particular predetermined locations relative to the wall board, and may be difficult to connect up where they are not easily accessible.

In this specification, where reference is made to a series of steps in a method or process, the steps are not intended to be in chronological order except where they are specifically introduced as such.

For the purposes of this specification, the term "heating element" is defined to mean any conductive or semi-conductive member or layer that undergoes a heating effect when an electrical current is passed through it.

For the purposes of this specification, the term "plastic" shall be construed to mean a term for materials generally regarded as being a "plastic" material and shall include, but not be limited to a wide range of synthetic or semi-synthetic polymerization products, and including hydrocarbon and non-hydrocarbon-based polymers.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present disclosure to provide a heating panel and method therefor, which overcomes or at least ameliorates some of the abovementioned disadvantages or which at least provides the public with a useful choice.

SUMMARY

In a first aspect the present disclosure broadly comprises a method of manufacture of a rigid heating panel comprising the steps of
  providing a continuous feed of a first sheet of material;
  continuously depositing a layer of settable gypsum slurry onto the first sheet of material in a continuous process to form a continuous open wallboard feed; wherein the method further includes one or more of the steps selected from:
    continuously depositing at least one heating element substantially along the length of the continuous open wallboard feed, and
    regularly depositing at least one heating element substantially along the length of the continuous open wallboard feed, wherein the heating element is configured in a heating layer, wherein the heating layer is embedded in the layer of settable gypsum slurry, wherein the method further comprises the step of providing a continuous feed of a second sheet of material at an opposed side of the settable gypsum slurry to the first sheet of material to form a closed wallboard feed.

Preferably, a plurality of heating elements are deposited.

Preferably the heating layer extends across substantially the entire width of the open continuous feed.

Preferably, the electrical conductor member is adapted to operate as a busbar at terminal points of the heating elements, and having a low resistance to flow of current relative to the heating element(s).

Preferably the electrical conductor member is deposited continuously along the sides of the length of the continuous open wallboard feed.

Preferably, the method includes the step of depositing at least one transverse conductor member, suitable for allowing termination of the heating panel at an opposed side of the heating panel from the heating element(s), along the length of the continuous wallboard feed.

Preferably, the transverse conductor member is at least partially incorporated in the settable slurry layer.

Preferably, the transverse conductor member is integrally formed with the settable slurry layer.

Preferably, the method comprises sizing the combined settable slurry and first sheet of material and second sheet of material layers by forcing it through a forming plate section of a predetermined size to form a pre-set continuously feeding heating panel of a consistent thickness.

Preferably, the electrical conductor is prefabricated as a continuous sheet of at least partially conductive material.

Alternately, the electrical conductor is at least partially prefabricated together with at least one selected from
the first sheet of material and
the second sheet of material.

Preferably, the electrical conductor is at least partially printed on at least one selected from
the first sheet of material and
the second sheet of material.

Preferably, the slurry layer is a gypsum slurry layer.

Preferably, the electrical conductor is arranged in a regular formation.

Alternately, the electrical conductor comprises an irregular arrangement of electrically conductive fibres.

Preferably, at least one of the first sheet of material and and/or second sheet of material are composed of material that is at least partially porous to water vapour and/or liquid.

Preferably, at least one of the first sheet of material and and/or second sheet of material are composed of paper.

Preferably, the electrical conductor is composed of one or more selected from
a metal or metallic alloy
a semi-conductor material; and
carbon fibre.

Preferably, the semi-conductor material is doped.

Preferably, the electrical conductor is prefabricated in a regular formation.

Preferably the heating layer is prefabricated in an elongate sheet formation.

Preferably the heating element is configured as a mesh comprising both conductive and non-conductive members.

Preferably the conductive and non-conductive members are elongate, and wherein the heating element is arranged with the non-conductive members extending substantially parallel to the pair of electrical conductors and the conductive members extending across the continuous open feed between the pair of electrical conductors.

Preferably, the regular formation of the electrical conductor is porous to water vapour and/or liquid.

Preferably, the regular formation of the electrical conductor is a mesh.

Preferably, the electrical conductor is prefabricated in a regular formation together with a non-conductive material.

Preferably, the electrical conductor is prefabricated in a regular formation together with a flexible elongate material.

Preferably, the flexible elongate material is one or more selected from glass fibre and plastic.

Preferably, one or more selected from the first sheet of material and the second sheet of material is fed from a roll.

Preferably, the method comprises the steps of
allowing the settable slurry in the pre-set continuously feeding heating panel to at least partially set; and
cutting the partially set continuously feeding heating panel to size. Preferably, the method further comprises the steps of stacking several similar cut heating panels in a heated environment to allow excess water to evaporate from the slurry and optionally to allow the slurry to cure.

Preferably, the method further comprises the steps of finishing the edges of the cured heating panels.

In a further aspect the present disclosure broadly comprises a heating panel made by the method of manufacture of a heating panel as described above.

In a further aspect the present disclosure broadly comprises a heating panel comprising
a wallboard portion including
a layer of settable material having two opposed major faces, and
a first outer layer of sheet material disposed on a major face of the layer of settable material; and
at least one heating element incorporated with the wallboard portion, wherein said heating element is one or more selected from:
composed of a fibre mesh.
composed at least partially of a loose agglomeration of conductive or semi-conductive fibres arranged in a layer;
composed of a loose agglomeration of conductive or semi-conductive fibres integrally formed within the layer of settable material;
printed on the first outer layer of sheet material; and
at least partially impregnated into the first outer layer of sheet material.

Preferably, the heating panel comprises a plurality of heating elements.

Preferably, the heating panel includes a plurality of electrical conductor members.

Preferably, the heating panel further comprises a conductor member. Preferably, the electrical conductor member is adapted to operate as a busbar at terminal points of the heating elements.

Preferably, the heating panel further comprises a second outer layer of sheet material disposed on a major face of the settable layer opposed to the first layer of sheet material.

Preferably, the sheet material on each side is porous.

Preferably, the sheet material on each side is fibrous.

Preferably, the sheet material on each side is paper.

Preferably, the heating element is configured in a heating layer.

Preferably, the heating element is disposed in a prefabricated layer.

Preferably, the prefabricated layer is of a mesh configuration.

Alternately, the heating element may be composed of a loose agglomeration of conductive or semi-conductive fibres.

Preferably the heating element is disposed in a heating layer between
one or more selected from
the first outer layer of sheet material and
the second outer layer of sheet material; and
the layer of settable material.

Alternately, the heating element is integrally formed within the layer of settable material.

Preferably, the heating layer comprises a mesh configuration of strands of conductive material.

Preferably, the heating layer comprises a mesh of strands of conductive and non-conductive material.

Preferably, the heating layer is disposed as a regular arrangement of parallel strands of conductive material extending across the width of the heating panel.

Alternately, the heating layer is disposed as a zigzag arrangement of one or more strands of conductive material extending from side to side along the length of the heating panel.

Preferably, the heating layer is printed on one or more selected from
the first outer layer of sheet material and
the second outer layer of sheet material.

Preferably, the heating layer is at least partially impregnated into one or more selected from
the first outer layer of sheet material and
the second outer layer of sheet material.

Preferably, the heating layer is at partially porous to water vapour and/or liquid. Preferably, the heating element comprises one or more selected from
a metal or metallic alloy
a semi-conductor material
carbon fibre; and
any other conductive or semi-conductive material.

Preferably, the semi-conductor material is doped.

Preferably, the heating panel comprises a transverse conductor member for allowing termination of the heating panel at an opposed side of the heating panel from the heating element(s).

Preferably, the transverse conductor member is at least partially incorporated in the settable material layer.

Preferably, the transverse conductor member is integrally formed with the settable material layer.

In a further aspect the present invention broadly comprises a method of installing a heating panel, comprising:
providing a heating panel;
cutting the heating panel to size,
terminating the heating panel; and
securing the heating panel to a structural frame.

Preferably, the structural frame comprises one or more selected from ceiling joists and wall studs.

Preferably, the method of installing a heating panel comprises a method of termination of the heating panel according to the invention.

In a further aspect the present invention broadly comprises a construction including an installed heating panel as described above.

In a further aspect the present invention broadly comprises a heating panel termination kit comprising
a heating panel according to the invention; and
a heating panel termination apparatus according to the invention.

Preferably, the heating panel termination kit further comprises a scoring tool for scoring of one or more of the outer layers of sheet material.

Preferably, the heating panel termination kit further comprises fasteners for fastening the heating panel to a support joist.

In a further aspect the present invention broadly comprises a heating panel termination apparatus comprising
a termination formation adapted to connect with at least one heating element in a heating panel; and
a connecting formation adapted to connect with an electrical cable.

The termination formation may be adapted to clamp onto a heating panel, thereby connecting to at least one heating element.

The termination formation may be adapted to be inserted into the layer of settable slurry of the heating panel, thereby connecting to at least one heating element.

The heating panel termination apparatus may comprise a securing formation for securing the heating panel termination apparatus to at least one support joist.

The termination apparatus may be adapted to support the heating panel while connecting to at least one heating element.

The termination formation may be adapted to support the heating panel while connecting to at least one heating element.

The termination formation may include a bonding face adapted and configured for adherence or bonding to at least one heating element in an electrically conductive manner.

Preferably, in one aspect, the termination formation provides a path for electrical current operationally that provides relatively less electrical resistance than the heating elements.

In a further aspect the present invention broadly comprises a method of terminating a heating panel, comprising:
scoring an outer layer of sheet material at least twice;
removing the sheet material from between the two scores; and
mechanically fixing and/or adhering an electrically conductive terminal member to at connect the terminal member to at least one or more heating elements disposed underneath the sheet material.

Preferably, the sheet material comprises paper.

In a further aspect the present invention broadly comprises a method of terminating a heating panel, comprising:
providing a heating panel according to the invention;
providing a termination apparatus according to the invention; and
inserting a termination formation into the heating panel to make connection with at least one heating element disposed underneath the sheet material.

In a further aspect the present invention broadly comprises a method of terminating a heating panel, comprising:
providing a heating panel according to the invention;
providing a termination apparatus according to the invention; and
clamping a termination formation onto the heating panel to thereby connect the termination formation to at least one heating element.

In a further aspect the present invention broadly comprises a method of terminating a heating panel, comprising:
providing a heating panel according to the invention;
providing a termination apparatus according to the invention;
securing the termination apparatus to a supporting joist by at least one securing formation; and supporting a heating panel on the termination apparatus thereby connecting the heating elements to the termination apparatus.

In another aspect the present invention broadly comprises a panel sheet comprising:
  a first outer layer;
  a second outer layer spaced from the first outer layer;
  a settable matrix interposed and attaching to each of the outer layers; and
  a heating element introduced between the outer layers or positioned so as to be between the outer layers; wherein said heating element comprises one or more selected from:
  composed of a fibre mesh;
  composed at least partially of a loose agglomeration of conductive or semi-conductive fibres arranged in a layer;
  composed of a loose agglomeration of conductive or semi-conductive fibres integrally formed within the settable matrix;
  printed on the first outer layer of sheet material; and
  at least partially impregnated into the first outer layer of sheet material;
  and wherein the heating element may or may not be coextensive with the panel but the outer layers are at least substantially coextensive with the settable material.

Preferably, the panel sheet comprises a plurality of heating elements.

Preferably, the panel sheet comprises a pair of electrical conductor members extending along opposed edges on a major face of the panel sheet.

Preferably, the electrical conductor members have relatively little electrical resistance compared to the heating elements.

Preferably, the plurality heating elements extend parallel to each other between the electrical conductor members.

Preferably, the heating element was introduced with the settable material.

Preferably, the outer layers are paper.

Other aspects of the present disclosure may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

To those skilled in the art to which the present disclosure relates, many changes in construction and widely differing embodiments and applications of the disclosure will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Aspects according to embodiments of the present invention will now be described by way of example only and with reference to the drawings in which.

DETAILED DESCRIPTION OF SEVERAL EMBODIMENTS

With reference to the above drawings, in which similar features are generally indicated by similar numerals, a heating panel according to a first aspect of the present disclosure is generally indicated by the numeral 100.

Figure 7:
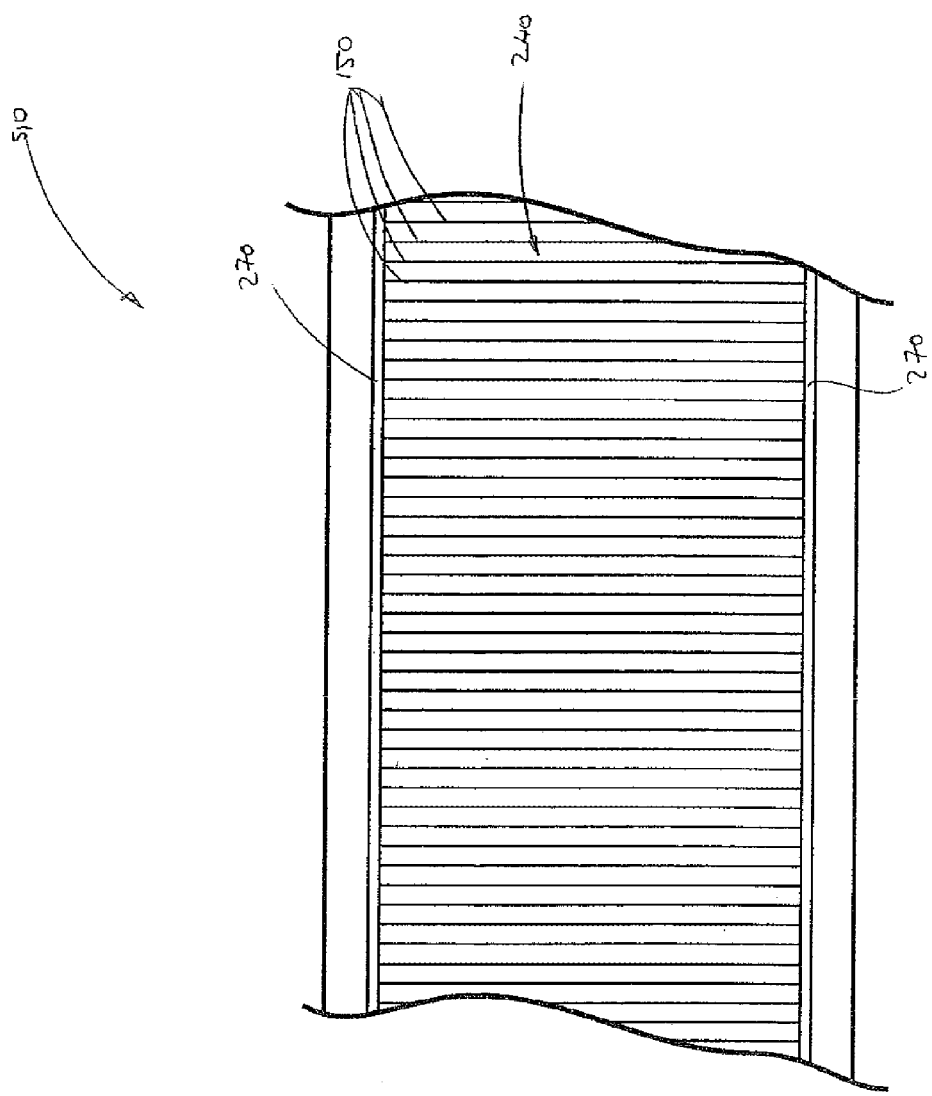
FIG. 7: shows a schematic plan view of a heating element configured in a parallel configuration of heating elements extending between two electrical conductor members along a continuous open wallboard feed.

In one embodiment according to the present disclosure now described, a heating panel 100 is provided. The heating panel 100 comprises a wallboard portion 110 including a layer of settable material 120 having two opposed major faces 130. The wall board portion 110 further includes a first outer layer 140 of sheet material (most preferably paper) and a second outer layer 160 of sheet material (most preferably paper) disposed on opposed major faces 130 of the layer of settable material 120. The heating panel 100 further includes a heating element 150 incorporated with the wallboard portion 110. In one embodiment (as shown in FIG. 7), the heating panel includes a pair of electrical conductor members 270 arranged in parallel to extend down the sides of the heating panel 100 to act as busbars (i.e. low resistance terminal points) for the heating elements 150.

It is envisaged that in a preferred embodiment, the heating elements 150 and the electrical conductor members 270 will be arranged in a single plane to form a heating layer when incorporated with the wallboard portion 110. However, this need not necessarily be the case, and it is also envisaged that at least the heating elements 150 (and possibly the electrical conductor members 270 too) could extend in the wallboard portion 110 in a non-planar manner, or in three dimensions.

The use of settable material in the settable material layer 120 is envisaged in a new and inventive continuous method of manufacture of heating panel as described below. The settable material layer 120 is envisaged to be composed of a settable slurry such as gypsum as this has the required physical properties, being:
  good insulative properties, and
  high thermal density.

However, in alternative embodiments, this need not necessarily be the case. Alternative materials envisaged could include heat resistant synthetic resins, high thermal density plastics, papier-mâché, fibre board type material, or any other suitably engineered material.

The use of paper is envisaged for the outer first and second layers of sheet material 140, 160, as it is porous and allows excess water in settable slurries like gypsum to evaporate off. However, where the settable material does not require excess water to be evaporated off, then non-porous material may be used.

Figure 2:
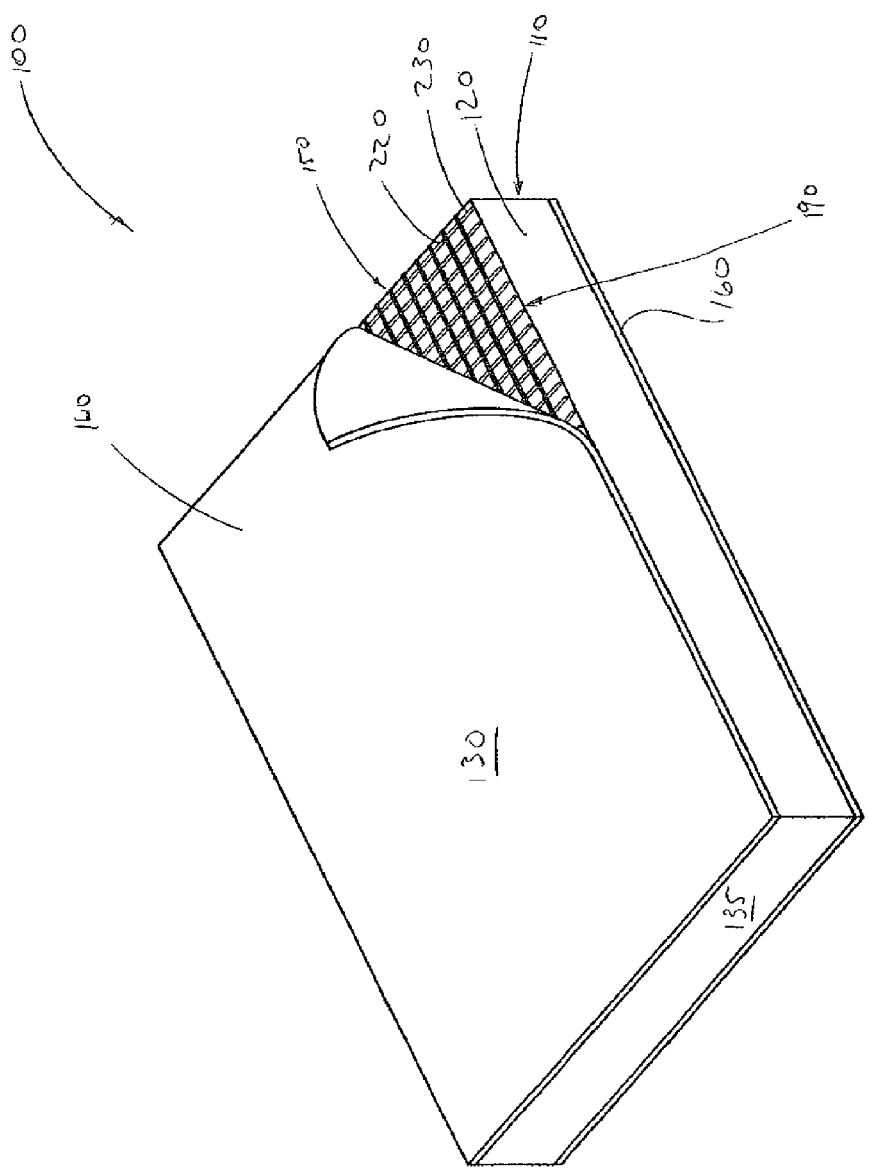
FIG. 2: shows an assembly view of a first embodiment of a heating panel.
Figure 3:
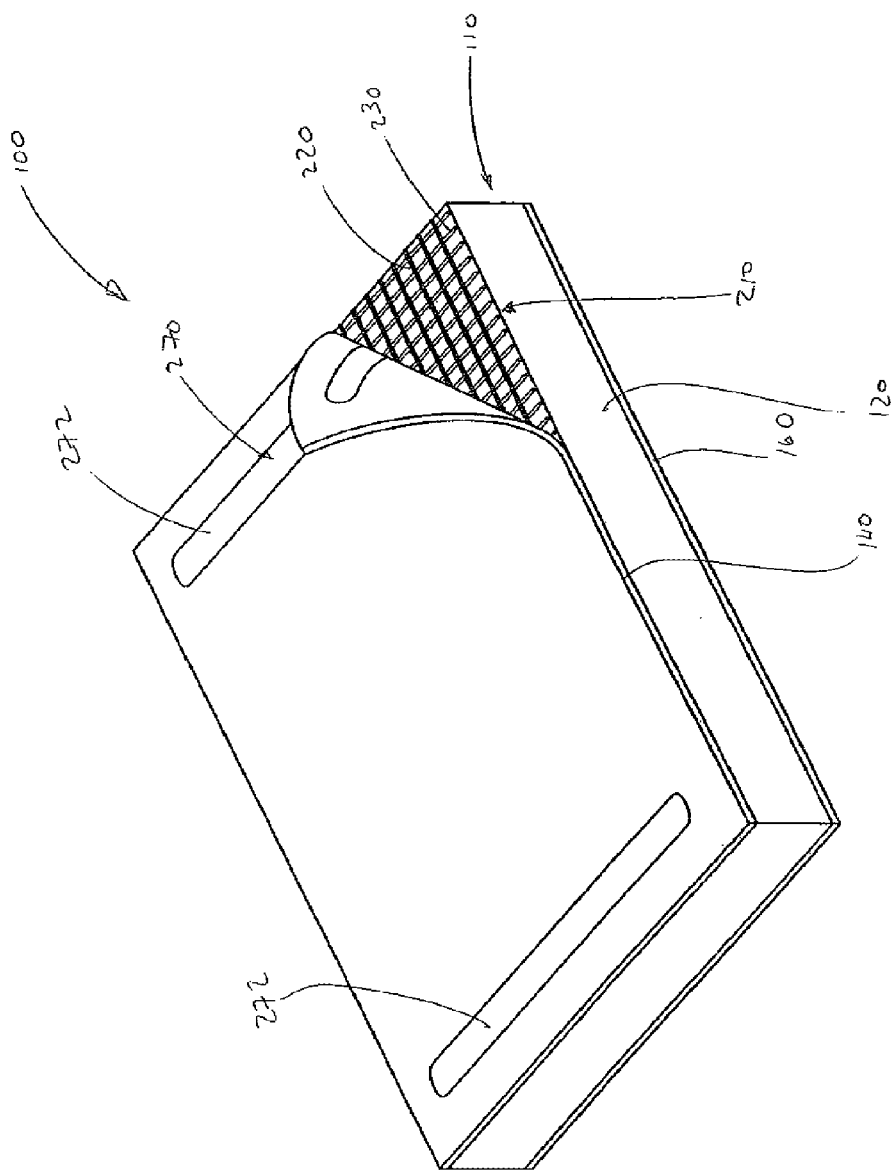
FIG. 3: shows an assembly view of a second embodiment of a heating panel.
Figure 5:
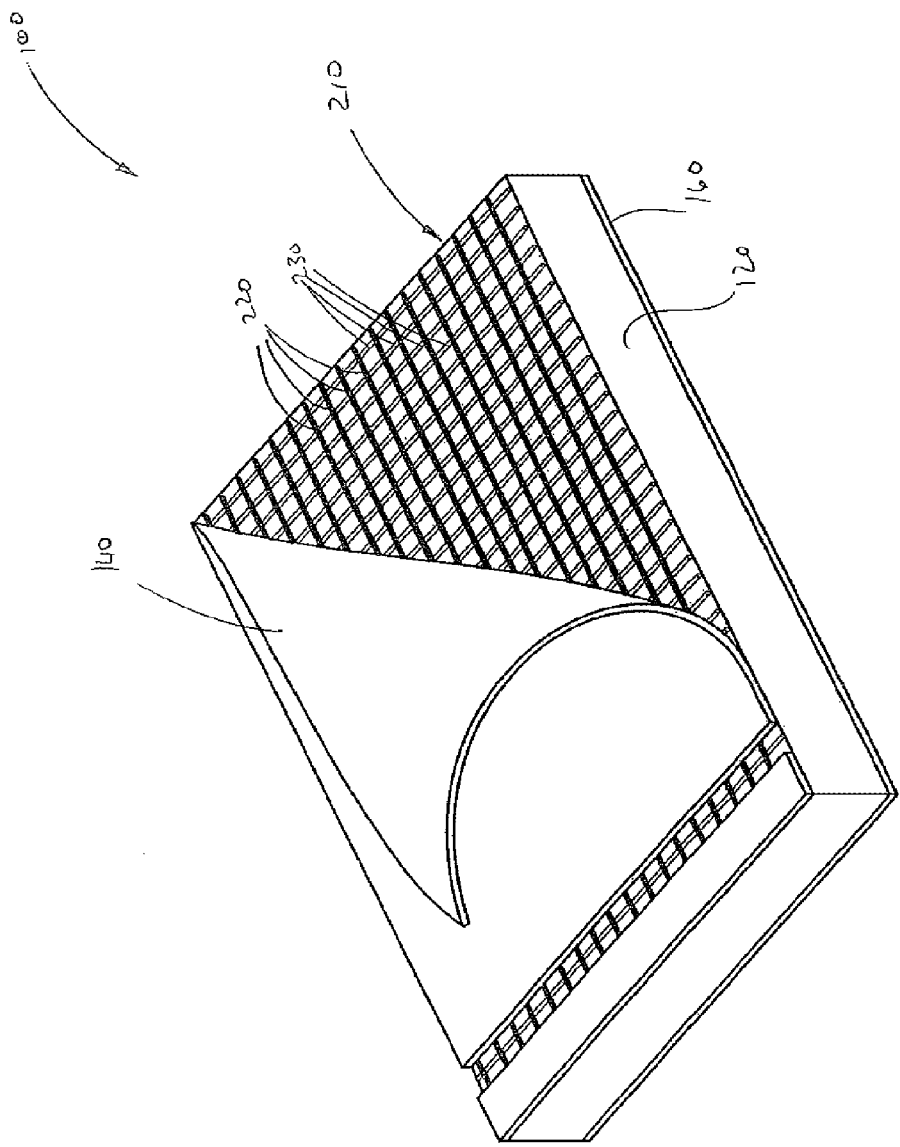
FIG. 5: shows an assembly view of the embodiment of a heating panel shown in FIG. 2, having been scored and prepared for termination.

In a preferred embodiment, the heating elements 150, and preferably the heating layer 170 will be prefabricated into a mesh configuration 210 (as shown on FIGS. 2, 3, and 5). The mesh configuration will comprise regularly spaced parallel strands of non-conductive material 230, such as glass fibre, extending across the heating layer 170, and regularly spaced parallel strands of conductive material 220, such as carbon fibre, extending across the heating layer 170 at right angles to the glass fibre strands to create a square or rectangular mesh configuration. The carbon fibre strands of conductive material 220 will preferably extend between two electrical conductor members 270, which may also be made of carbon fibre or any other suitable engineering material to provide a relatively high conductivity compared to the heating elements 150.

The use of a prefabricated mesh configuration for the heating layer 170 allows for benefits in the manufacture of the heating panel 100, will become clearer when the manufacturing process is explained below.

In another embodiment, it is envisaged that the mesh configuration 210 can be a loose agglomeration of one or more of conductive fibres, semi-conductive fibres and non-conductive fibres. The mesh configuration 210 can also extend in 3 dimensions, and can be incorporated within or integrally formed with the layer of settable material 120.

In a preferred embodiment, the mesh configuration 210 will extend as a heating layer 170 between the layer of settable material 120 and one of the outer layers of sheet material 140, 160, or both.

Figure 8:
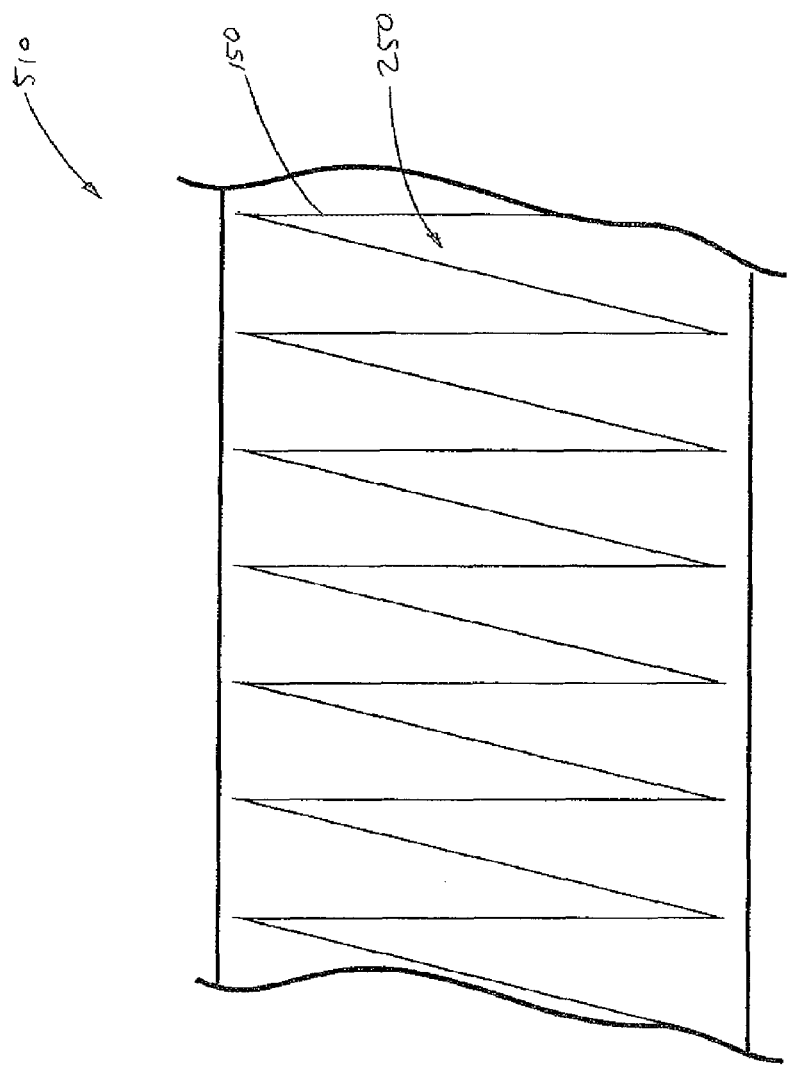
FIG. 8: shows a schematic plan view of a heating element configured in a zigzag configuration of a single element along a continuous open wallboard feed.

In another embodiment, at least one or more of the heating elements 170 may be configured as a zigzag arrangement 250 as shown in FIG. 8. It is envisaged that such a zigzag arrangement would be conducive to the forming an electrical heating circuit operating in series when the heating panel has been terminated.

Figure 4:
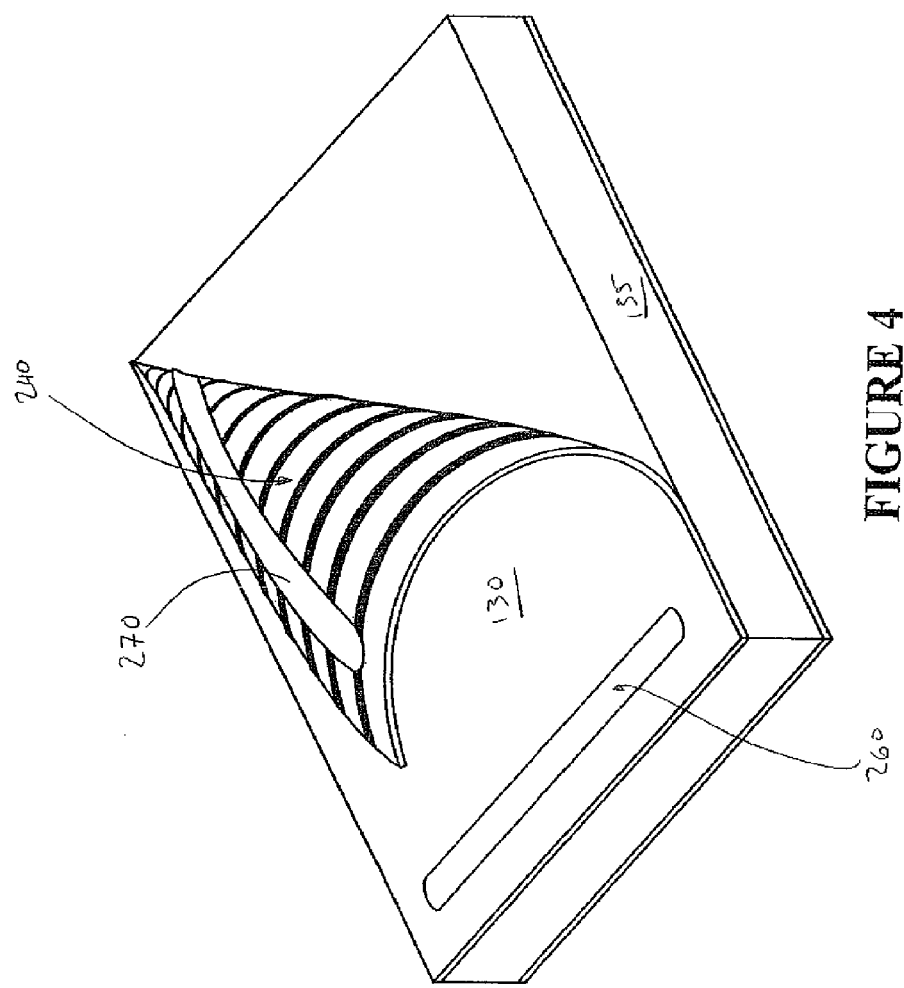
FIG. 4: shows an assembly view of a third embodiment of a heating panel.
Figure 6:
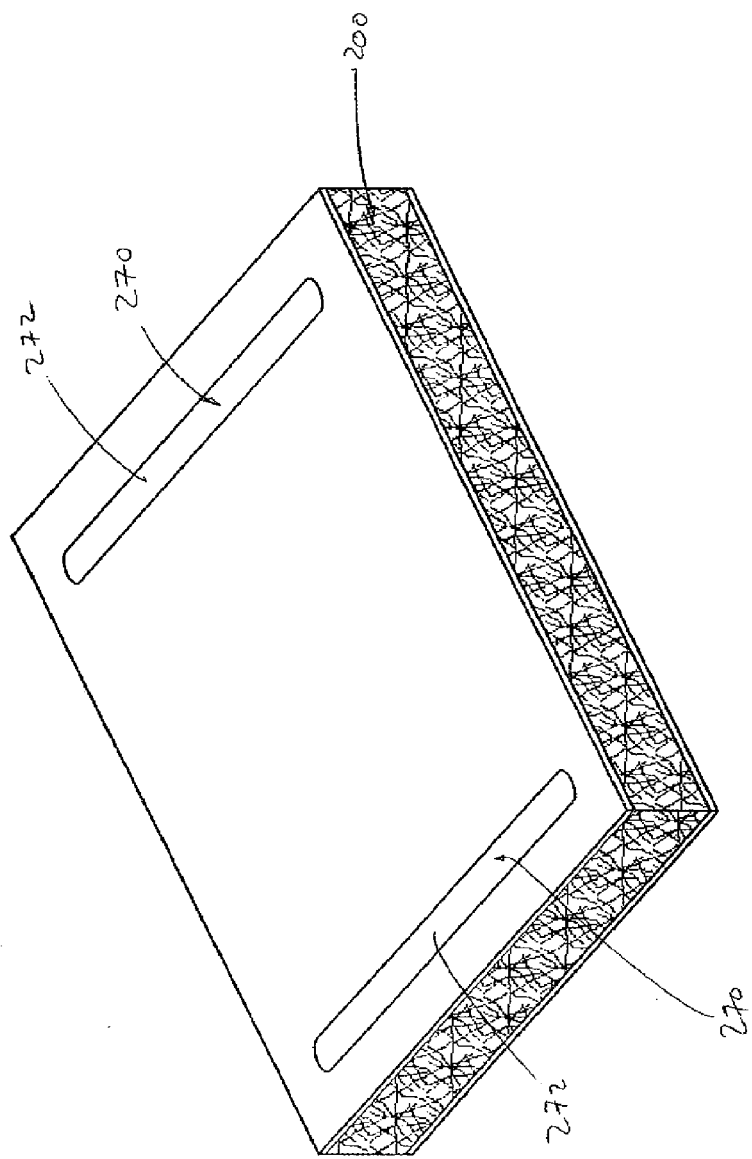
FIG. 6: shows an assembly view of a fourth embodiment of a heating panel.

In yet another embodiment shown in FIGS. 3, 4 and 6, the heating elements and/or electrical conductor members may be printed onto the one or both of the first and second outer layers of sheet material 140, 160. In a preferred embodiment, the heating layer can be printed to the inside face of one or both of the first and second outer layers of sheet material 140, 160.

It is envisaged that where the layer of settable material 120 is composed of a slurry requiring excess liquid (not shown) to be removed, then the heating layer 170 should preferably be porous to water vapour and/or the liquid to allow the water vapour and/or liquid to move to, and through, one or both of the outer layer of sheet material 140, 160 (which will preferably be porous as well).

In yet another embodiment, it is envisaged that the electrical conductor member 270 may be impregnated into one or both of the first and second outer layers of sheet material 140, 160, thereby to make contact with the heating elements 150 underneath one or both of the first and second outer layers of sheet material 140, 160 and to provide a termination surface 272 outside one or both of the outer layers of sheet material. This is advantageous in that the termination of the heated panel 100 can be easily achieved by mechanically fixing and/or adhering electrical conductors from a power supply to the termination surface 272 of the impregnated electrical conductor members 270.

Where such electrical conductor members 270 are impregnated at regular intervals along the length of the heater panel 100, these electrical conductor members 270 act as "busbars" to facilitate the flow of similar charges through the heating elements 150, thereby allowing for relatively even heating around the heating layer 170. Any unused termination surfaces 272 can be conveniently taped over with an insulative adhesive tape to prevent short-circuiting of the heating panel 100 or other safety hazards.

Where a heating panel 100 is installed, it is desirable for the heating elements 150 to be located at or towards the side of the layer of settable material 120 that it is intended to heat. For this reason, in one embodiment the heating layer can be embedded in the layer of settable material 120, or be on the lower side (when installed) of the layer of settable material 120. This prevents the entire layer of settable material 120 having to be heated up before it able to have a radiant heating effect.

However, where the heating layer 170 is embedded in the layer of settable material, and the layer of settable material 120 is composed of a slurry that requires excess water to be evaporated, then it would be desirable for the heating layer to be at least partially porous to water vapour or other liquid so that the heating layer does not seal liquid or water vapour into the layer of settable material 120 (as this may cause the formation of bubbles or other aesthetically undesirable formations).

It is envisaged that the heating elements 150 and/or electrical conductor members 270 could be composed of any conductive or semi-conductive material, such as one or more selected from a metal or metallic alloy, a semi-conductor material, carbon fibre; and any other conductive or semi-conductive material.

It will be appreciated that where the heating elements and/or electrical conductor members 270 are printed onto (or impregnated with) the first or second outer layer of sheet material 140, 160 then the material will be required to have suitable properties for use in a printing process, as well the required electrical conductivity properties. In one preferred embodiment, it is envisaged that doped semi-conductor material may be used, having similar properties to printed semi-conductors used in the printing of circuitry on silicon chips.

In some embodiments, where the heating elements 150 are located towards the side to be heated, for example on the lower side of a ceiling or towards the inside of a house, then it would be aesthetically desirable to have the termination of the heating elements 150 hidden from view.

Figure 9:
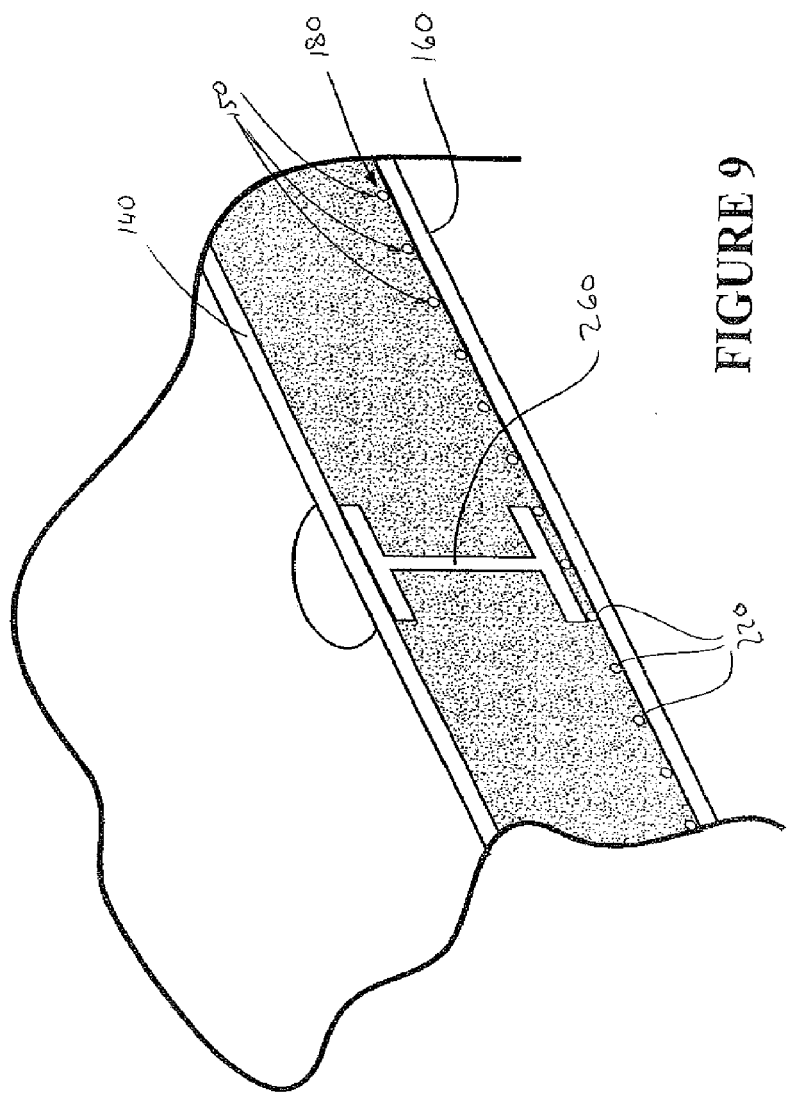
FIG. 9: shows a cutaway view of a transverse conductor member incorporated into a layer of settable material of a heating panel.

This can be accomplished by the use of transverse conductor members 260 shown in FIG. 9, which conduct electricity to and from the heating elements from the opposed major face of the layer of settable material. Such transverse conductor members 260 can be integrally formed or set into the layer of settable material 120 as shown in FIG. 9.

Alternately, the transverse conductor member(s) 260 can extend around one of the four minor faces 135 of the heating panel to make contact with a heating element 150 in an aesthetically pleasing way. The transverse conductor members 260 could clamp onto an edge of the heating panel 100. Alternatively, the transverse conductor members 260 could be configured and dimensioned for being inserted form a minor face at least partially into the layer of settable material 120, or under a layer of sheet material 140, 160, to make contact with one or more heating elements 150 as shown in FIG. 9.

In yet another embodiment, it is envisaged that the transverse conductor members 260 could act to support the heating panel 100 in a ceiling or along a wall in an aesthetically pleasing way. This would be possible for example as shown in a ceiling in FIG. 10 where a termination surface 272 faces downwardly and is supported by a transverse conductor member 260 in the form of a termination formation 710. The termination surface 272 is impregnated in one of the layers of sheet material 140, 160 (facing downwardly) and makes contact with the heating elements 150 located on the lower side of the layer of settable material 120.

Figure 1:
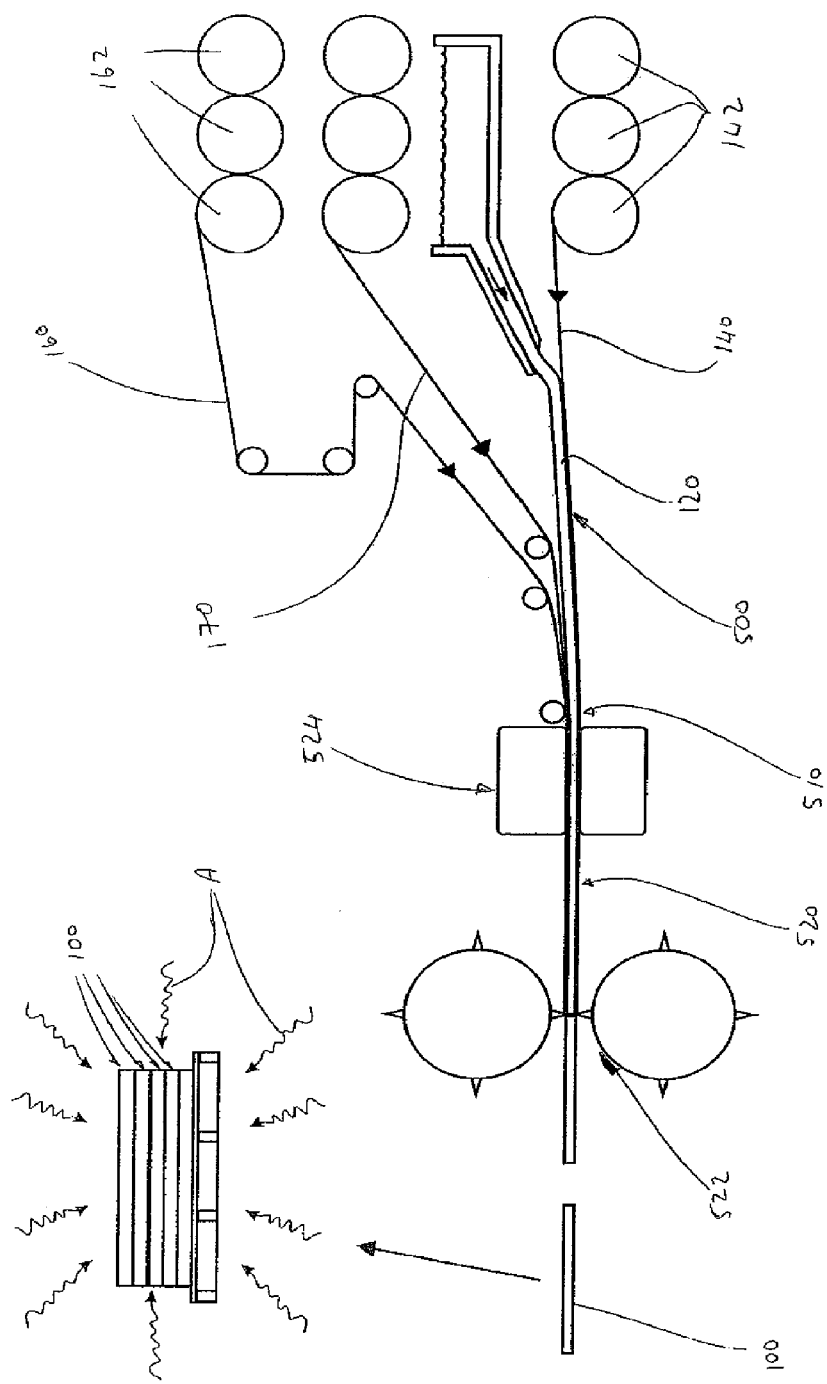
FIG. 1: shows a schematic view of a method of manufacture of a heating panel

According to another aspect of the present disclosure (and as shown in FIG. 1) there is provided a method of manufacture of a heating panel comprising several steps (which may not necessarily be in the same chronological order). The method of manufacture of a heating panel comprises the step of providing a continuous feed of a first outer layer of sheet material 140 as described above (preferably from a roll 142, which may be spliced together with other rolls 142). A layer of settable material 120 (such as gypsum slurry or the like described above) is deposited onto the first sheet of material in a continuous process to form a continuous open wallboard feed 500.

The method of manufacture further comprises one or more of the steps selected from
continuously depositing at least one heating element 150 substantially along the length of the continuous open wallboard feed 500; and
regularly depositing art least one heating element substantially along the length of the continuous open wallboard feed 500.

This deposition of the heating element(s) 150 will form a partially formed heating panel 510. In the first of these steps depositing the heating element(s) 150, it is envisaged that one or more heating elements 150 could be deposited continuously along the length of the continuous open wallboard feed 500 in a zigzag type formation as shown in FIG. 8.

In the second of these steps it is envisaged that one or more heating elements could be deposited at regular intervals along the continuous open wallboard feed 500. An example of this would be the regular deposition of strands of carbon fibre heating elements 150 extending transversely or partially transversely to the direction of movement of the continuous open wallboard feed 500.

It is envisaged that such a regular deposition of the heating elements 150 may be deposited as part of the deposition of a heating layer composed of heating elements 150 and other fibres such as glass fibres. One example of this is the deposition of a mesh 210 (as shown in FIGS. 2, 3, and 5) as a heating layer 170, the mesh 210 comprising strands of conductive material 220 like carbon fibre extending transversely along the continuous open wallboard feed 500, and strands of non-conductive material 230, such as glass fibre, extending longitudinally along the continuous open wallboard feed 500, or vice versa.

In yet another embodiment, the heating elements can be deposited as an irregular arrangement of electrically conductive fibres (not shown). This regular arrangement of electrically conductive fibres could be deposited as a heating layer 170 between the layer of settable material 120 and one or more of the outer layer of sheet material 140, 160, or they could be incorporated within the layer of settable material as shown in FIG. 6.

The method of manufacture further may optionally further comprise one or both of the steps selected from:
continuously depositing at least one electrical conductor member 270 substantially along the length of the continuous open wallboard feed 500, said electrical conductor member 270 being relatively more conductive than the heating element 150; and
regularly depositing art least one electrical conductor member 270 substantially along the length of the continuous open wallboard feed 500, said electrical conductor member 270 being relatively more conductive than the heating element 150.

It is envisaged that the electrical conductor member 270 may be deposited together with the heating elements in a heating layer 170. The electrical conductor member 270 can be prefabricated as a mesh 210 in a heating layer 170 together with the heating elements 150, or it can be deposited in a heating layer 170 apart from the heating elements 150.

The method of manufacture of a heating panel can further comprise the step of providing a continuous feed of a second outer layer of sheet material 160 (preferably from a roll 162, which may be spliced together with other rolls 162) at an opposed side of the layer of settable material 120 to the first outer layer of sheet material 140 to form a closed wallboard feed.

Again it is emphasised that the steps as described are not necessarily in chronological order. As an example, the heating elements 150 and/or the electrical conductor member 270 can be printed onto the first or second layer of sheet material 140, 160 as a heating layer 170. In such a case it is envisaged that the step of printing will have been carried out in a prior process to allow for the drying of the printed layer. However, this need not necessarily be the case, and the printing may be carried out at the time of the deposition of the layer of settable material 120.

In an alternate embodiment, the step of printing can have been carried out with the printing of the electrical conductor member 270 being pre-printed onto one of the first or second layer of sheet material 140, 160, and the heating elements being printed onto the other of the first or second layer of sheet material 140, 160.

The method of manufacture of a heating panel 100 may optionally comprise a further step of depositing at least one transverse conductor member 260 for allowing termination of the heating panel 100 at an opposed side of the heating panel from the heating element(s) along the length of the continuous wallboard feed. The transverse conductor member 260 can be deposited as a continuous configuration, or as regular deposits of single transverse conductor members 260. In one preferred embodiment the transverse conductor members 260 can be a series of electrically conductive transverse conductor members 260 placed at regular locations along the length of the continuous open wallboard feed 500 and at least partially incorporated into or integrally formed with the layer of settable material 120.

In another embodiment, the transverse conductor member 260 can be a continuous length of electrically conductive mesh 261 (not shown) deposited to fit around the edges of the layer of settable material 120 and to sit between the layer of settable material 120 and the first and second outer layers of sheet material 140,160.

Preferably, the method of manufacture of a heating panel 100 includes the step of sizing the thickness and/or width of the combined layer of settable material, and one or both of the first outer layer of sheet material 140 and the second outer layer of sheet material 160 to form a pre-set continuously feeding heating panel 520 of a consistent thickness.

A preferred method of manufacture of a heating panel includes the steps of allowing the layer of settable material in the pre-set continuously feeding heating panel 520 to at least partially set (to enable handling and finishing of the partially set heating panels); and cutting the continuously feeding heating panel to a required size for shipment by means of a cutting mechanism 522.

The preferred method of manufacture of a heating panel 100 further includes the step, where gypsum or a water based settable slurry is used, of stacking several similar cut heating panels and subjecting them to a heating effect (shown as arrows A in FIG. 1), preferably in a heating chamber, to allow excess water to evaporate from the slurry and to move through the porous paper in the first and second outer layers of sheet material 140,160.

Lastly the method of manufacture can include the step of finishing the edges of the set heating panels 100.

It is envisaged that a heating panel 100 according to the one aspect of the present disclosure will be conveniently installable. This may be accomplished by first providing a heating panel 100 according to an embodiment of the present disclosure; cutting the heating panel 100 to size to fit onto the wall and/or ceiling as required, terminating the heating panel, and securing the heating panel 100 to a structural frame (not shown) such as a ceiling joists and/or wall studs of a house or other construction (not shown).

It should be noted that in preferred embodiments of the heating panel, the heating panel can be cut to any desired length without affecting the heating properties of the heating panel. Where various other configurations of meshes of heating elements 150 and/or electrical conductor members 270 are used(such as a mesh of both longitudinal and transverse strands of conductive material 230, it is envisaged that the heating panels could be cut to a desired width and length without breaking the electrical heating circuit through the heating panel.

In a further aspect of the invention, a heating panel termination apparatus 700 is provided. The termination apparatus 700 comprises a termination formation 710 adapted to connect with at least one heating element in a heating panel; and a connecting formation 730 adapted to connect with an electrical cable 600.

Figure 11:
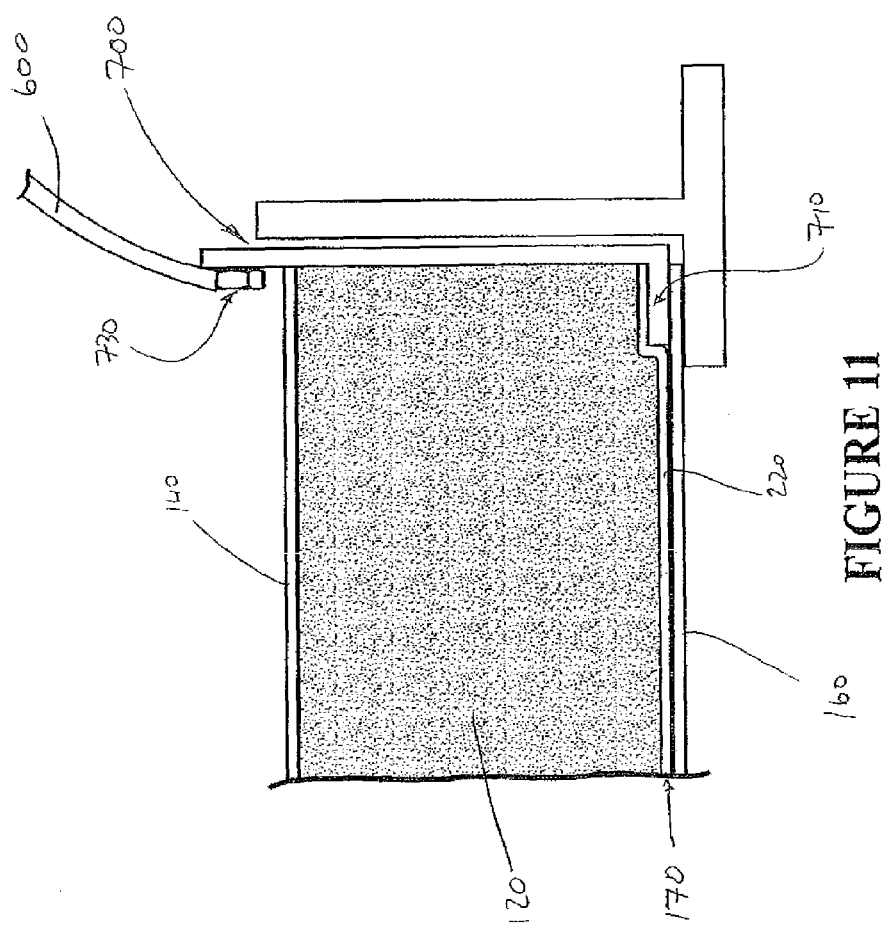
FIG. 11: shows an alternative embodiment of a heating system.

It is envisaged that the termination formation 700 can be adapted to clamp onto a heating panel 100, thereby connecting to at least one heating element 150, or may be adapted (by for example having a sharpened point) to be inserted into the layer of settable material 120 of the heating panel 100 (as shown in FIG. 11), thereby connecting to at least one heating element 150.

Additionally, the termination apparatus 700 can include securing formations 720 for securing the termination apparatus 700 to at least one support joist (not shown), for example in the form of one or more of
- a nut and bolt formation (not shown) or
- a hole (not shown) for receiving a nail or staple; or
- a hook formation for hooking over a support joist; or
- a wedging formation for wedging against a complementary support formation.

Figure 10:
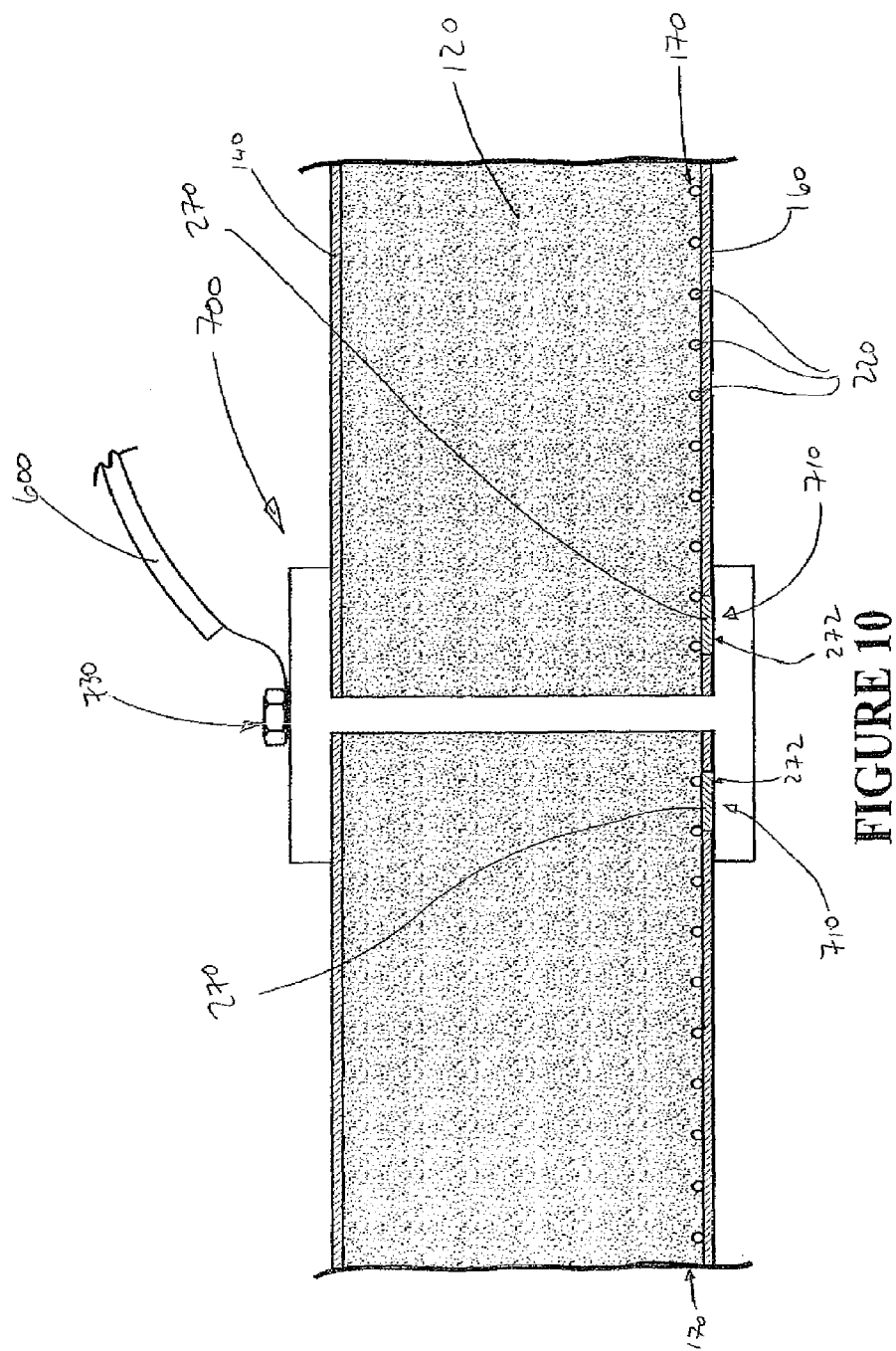
FIG. 10: shows a heating system.

In one preferred embodiment as shown in FIG. 10, the termination apparatus 700 is be adapted to support the heating panel 100 while making an electrical connection with at least one heating element 150.

The termination formation 710 can in another embodiment include a bonding face (not shown) adapted for being bonded or adhered to a heating element 150.

In a preferred embodiment, the termination formation 710 of the termination apparatus 700 provides a path for electrical current operationally that is provides relatively less electrical resistance than the heating elements, so that the termination formation acts a as busbar. In this way, the requirement for an electrical conductor member 270 as part of the heating panel 100 is negated or at least partially reduced.

It will be appreciated that the combination of the heating panel 100 and the termination apparatus 700 together form a heating system 1000 that may be conveniently installed, terminated and/or supported.

It is envisaged that this heating system 1000 could be sold as separate pieces in a kit (not shown) for installing heating system 1000. Such a kit would include a heating panel 100 according to the present disclosure; and a heating panel termination apparatus 700 according to the present disclosure. The kit may also include fasteners (not shown) for fastening one or both of the heating panel 100 and the termination apparatus 700 to a supporting ceiling joist(not shown) or wall stud (not shown), and electrical connector members (not shown) such as cabling). Further, the kit could include a scoring tool (not shown), such as a knife, for scoring of one or more of the outer layers of sheet material 140, 160 in preparation for termination of the heating panel 100.

The termination of the heating panel 100 can be accomplished by differing methods depending on the embodiment of the present disclosure being terminated.

As an example, where the embodiment comprises a heating layer of heating elements located between the layer of settable material 120 and an outer layer of sheet material such as paper, then the method of terminating the heating panel will include the steps of scoring an outer layer of sheet material in two parallel lines across the length or breadth of the heating panel; removing the sheet material from between the two scores to expose the heating elements underneath; and mechanically fixing and/or adhering an electrically conductive terminal member to at least one of exposed heating elements 150.

For the same embodiment of a heating panel, the method of terminating a heating panel can comprise the steps of providing a heating panel according to the present disclosure; providing a termination apparatus 700 as described above according to the present disclosure; and inserting a termination formation 710 into the heating panel 100 to make connection with at least one heating element disposed underneath the first or second layer of sheet material 140, 160.

For the same embodiment of the heating panel 100, another method of termination of the heating panel 100 can comprise the steps of providing a heating panel 100 according to the present disclosure; providing a termination apparatus 700 according to the present disclosure as described above which clamps around the edges and at least one minor face 135 of the layer of settable material 120; and clamping the termination formation 710 onto the heating panel 100 to thereby connect the termination formation 710 to at least one heating element 150.

Where, for instance, the electrical conductor member 270 is impregnated into one of the outer layers of sheet material 140, 160, then the heating panel can be supported on a supporting termination apparatus 700 so that the termination surface 272 of the electrical conductor member 270 is touching the termination apparatus 700 so that an electrical connection is established in operation between the heating panel 100 and the supporting termination apparatus 700.

In this embodiment the method of termination of the heating panel 100 comprises the steps of providing a heating panel 100 according to the present disclosure as described above; providing a termination apparatus 700 according to the present disclosure as described above; securing the termination apparatus 700 to a supporting joist (not shown) by at least one securing formation 720; and supporting a heating panel 100 on the termination apparatus 700 thereby connecting the heating elements 150 to the termination apparatus 700.

Where in the foregoing description reference has been made to elements or integers having known equivalents, then such equivalents are included as if they were individually set forth.

Although aspects of the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. A method of manufacture of a wallboard heating panel comprising the steps of:
   providing a continuous feed of a first sheet of material; and
   continuously depositing a layer of settable gypsum slurry onto the first sheet of material in a continuous process to form a continuous open wallboard feed;
wherein the method further includes one or more of the steps selected from:
   continuously depositing at least one heating element substantially along the length of the continuous open wallboard feed; and
   regularly depositing at least one heating element substantially along the length of the continuous open wallboard feed,
wherein the heating element is configured in a heating layer, wherein the heating layer is embedded in the layer of settable gypsum slurry, wherein the method further comprises the step of:
   providing a continuous feed of a second sheet of material at an opposed side of the settable gypsum slurry to the first sheet of material to form a closed wallboard feed.

2. A method as claimed in claim 1 wherein the method further includes one or more of the steps selected from:
   continuously depositing at least one electrical conductor member substantially along the length of the continuous open wallboard feed, said electrical conductor member being relatively more conductive than the heating element; and
   regularly depositing at least one electrical conductor member substantially along the length of the continuous open wallboard feed, said electrical conductor member being relatively more conductive than the heating element.

3. A method as claimed in claim 1, wherein a plurality of heating elements are deposited.

4. A method as claimed in claim 2, wherein a plurality of electrical conductor members are deposited.

5. A method as claimed in claim 2, wherein the electrical conductor member is adapted to operate as a busbar at terminal points of the heating elements, and having a low resistance to flow of current relative to the heating element(s).

6. A method as claimed in claim 2, wherein the electrical conductor member is deposited continuously along the sides of the length of the continuous open wallboard feed.

7. A method as claimed in claim 1, wherein the method includes the step of depositing at least one transverse conductor member, suitable for allowing termination of the heating panel at an opposed side of the heating panel from the heating element(s), along the length of the continuous wallboard feed.

8. A method as claimed in claim 6, wherein the method includes the step of sizing the closed wallboard feed by forcing it through a forming plate section of a predetermined size to form a pre-set continuously feeding heating panel of a consistent thickness.

9. A method as claimed in claim 2, wherein the electrical conductor member is prefabricated as a continuous sheet of at least partially conductive material.

10. A method as claimed in claim 2, wherein the electrical conductor member is at least partially prefabricated together with at least one selected from the first sheet of material and the second sheet of material.

11. A method as claimed in claim 2, wherein the electrical conductor member is at least partially printed on at least one selected from the first sheet of material and the second sheet of material.

12. A method as claimed in claim 2, wherein the electrical conductor member is arranged in a regular formation.

13. A method as claimed in claim 2, wherein the electrical conductor comprises an irregular arrangement of electrically conductive fibres.

14. A method as claimed in claim 1, wherein at least one selected from the first sheet of material and second sheet of material are composed of material that is at least partially porous to one or more selected from water vapour and liquid.

15. A method as claimed in claim 1, wherein at least one or more selected from the first sheet of material and second sheet of material are composed of paper.

16. A method as claimed in claim 1, wherein the electrical conductor member is composed of one or more selected from a metal or metallic alloy; a semi-conductor material; and carbon fibre.

17. A method as claimed in claim 16, wherein the semi-conductor material is doped.

18. A method as claimed in claim 1, wherein one or more selected from the first sheet of material and the second sheet of material is fed from a roll.

19. A method as claimed in claim 1, wherein the method comprises:
   allowing the settable gypsum slurry in the pre-set continuously feeding heating panel to at least partially set; and
   cutting the partially set continuously feeding heating panel to size.

20. A method as claimed in claim 19, wherein the method further comprises stacking several similar cut heating panels in a heated environment to allow excess water to evaporate from the slurry and to allow the settable gypsum slurry layer to cure to form cured heating panels.

21. A heating panel made by the method of manufacture of a heating panel as claimed in claim 1.

* * * * *